United States Patent
Kim et al.

(10) Patent No.: US 11,372,418 B2
(45) Date of Patent: Jun. 28, 2022

(54) ROBOT AND CONTROLLING METHOD THEREOF

(71) Applicant: LG ELECTRONICS INC., Seoul (KR)

(72) Inventors: Boyeon Kim, Seoul (KR); Bina Kim, Seoul (KR); Jinsu Kim, Seoul (KR); Mina Suh, Seoul (KR); Jungkyu Son, Seoul (KR); Hyesun Lee, Seoul (KR); Jinwon Kang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 141 days.

(21) Appl. No.: 16/842,395

(22) Filed: Apr. 7, 2020

(65) Prior Publication Data

US 2021/0072758 A1    Mar. 11, 2021

(30) Foreign Application Priority Data

Sep. 9, 2019    (KR) .......................... 10-2019-0111751

(51) Int. Cl.

| | |
|---|---|
| *G05D 1/02* | (2020.01) |
| *A61G 5/12* | (2006.01) |
| *A61G 5/04* | (2013.01) |
| *B60N 2/00* | (2006.01) |
| *G01S 19/42* | (2010.01) |
| *B60L 58/10* | (2019.01) |

(52) U.S. Cl.
CPC ............ *G05D 1/0217* (2013.01); *A61G 5/04* (2013.01); *A61G 5/122* (2016.11); *A61G 5/125* (2016.11); *A61G 5/128* (2016.11); *B60L 58/10* (2019.02); *B60N 2/002* (2013.01); *G01S 19/426* (2013.01); *G05D 1/0225* (2013.01); *G05D 2201/0206* (2013.01)

(58) Field of Classification Search
CPC .............. G05D 1/0217; G05D 1/0225; G05D 2201/0206; A61G 5/125; A61G 5/122; A61G 5/128; A61G 5/04; B60L 58/10; B60N 2/002; G01S 19/426
See application file for complete search history.

(56) References Cited

U.S. PATENT DOCUMENTS

| | | | | |
|---|---|---|---|---|
| 2012/0206099 | A1* | 8/2012 | Ichikawa | ................ B60L 53/66 320/109 |
| 2015/0219464 | A1* | 8/2015 | Beaurepaire | ....... G01C 21/3438 701/538 |
| 2017/0232868 | A1* | 8/2017 | Izuno | ................ B60R 21/01556 73/760 |
| 2019/0171209 | A1* | 6/2019 | Lee | ......................... G08G 1/168 |
| 2020/0108724 | A1* | 4/2020 | Bartlett | ................ B60W 50/14 |

* cited by examiner

*Primary Examiner* — Tyler J Lee
*Assistant Examiner* — Yufeng Zhang
(74) *Attorney, Agent, or Firm* — Birch, Stewart, Kolasch & Birch, LLP

(57) ABSTRACT

A robot according to an embodiment may include at least one driving motor for providing a driving force for driving of the robot, a position detector including at least one sensor or receiver for detecting a position of the robot, a pressure detector including at least one sensor for detecting whether a user who in on board the robot gets off the robot and a processor for detecting the position of the robot through the position detector, recognizing that the user has arrived at the destination when it is detected that the user gets off the robot and recognize that the user has not arrived at the destination when it is not detected that the user gets off the robot.

18 Claims, 5 Drawing Sheets

ROBOT AND CONTROLLING METHOD THEREOF

CROSS-REFERENCE TO RELATED APPLICATIONS

This application claims the priority benefit of Korean Patent Application No. 10-2019-0111751 filed in the Republic of Korea on Sep. 9, 2019, which is hereby incorporated by reference in its entirety for all purposes as if fully set forth herein.

BACKGROUND OF THE INVENTION

1. Field of the Invention

The present disclosure relates to a robot and a control method thereof, and more particularly, to a robot and a control method for determining whether arrival is completed and performing control when the user arrives at a destination after being on board.

2. Discussion of the Related Art

Recently, functions of a robot are expanding due to development of deep learning technology, self-driving technology, automatic control technology, the Internet of Things, and the like.

In regard to each technology in detail, the deep learning is one of fields of machine learning. The deep learning a technology of allowing a program to execute similar determinations in various situations, not checking conditions and setting the program with commands in advance. Accordingly, according to the deep learning, a computer can think similarly to a human brain and analyze massive amounts of data.

Self-driving is a technology that allows machine to determine on its own to move and avoid an obstacle. According to the self-driving technology, a robot autonomously recognizes a location through a sensor to move and avoid an obstacle.

The Internet of Things refers to an intelligent technology and service that connects all things based on the Internet and communicates information between a person and an object, and between objects. Devices connected to the Internet by the Internet of Things transmit and receive the information by their own determinations and communicate with each other autonomously without any assist of a human.

Applications of the robot are generally classified into industrial, medical, astronautic, and submarine field. For example, the robot may perform repetitive tasks in the machining industry such as automobile manufacturing. In other words, a lot of industrial robots have been already in operation in which the robots can repeat the same motion for hours once a human teaches a task performed by an arm to the robots.

Particularly, in the case of autonomous driving robots, it is necessary to determine whether a user has arrived at a desired destination. However, the autonomous driving robots need to perform a task of returning to the charging station without ending the task even after a passenger gets off, requiring accurate recognition as to whether the user has finished the use of the robot and has gotten off.

In addition, even when the robot arrives at the destination on a guide route of navigation, an occupant wants to reach a correct spot even within the range of the destination, for example, in the case of a small robot targeting a handicapped person. Therefore, when there occurs a difference between the destination set in the robot and a spot at which the occupant actually wants to get off, the robot should be able to recognize and deal with this situation smoothly.

SUMMARY OF THE INVENTION

An object of the present disclosure is to provide a robot and a control method thereof capable of detecting whether a user arrives at a desired destination and performing a corresponding operation based on a detection result when at a set destination is reached.

A robot according to an embodiment includes at least one driving motor configured to provide a driving force for driving of the robot, a position detector including at least one sensor or receiver for detecting a position of the robot, a pressure detector including at least one sensor for detecting whether a user who in on board the robot gets off the robot, and, a processor configured to detect the position of the robot through the position detector while the robot is traveling, detect whether the user gets off the robot through the pressure detector when the detected position corresponds to a destination included in boarding information of the user, and recognize that the user has arrived at the destination when it is detected that the user gets off the robot and recognize that the user has not arrived at the destination when it is not detected that the user gets off the robot.

According to embodiments, the robot may further include a communication interface configured to receive map data related to a space in which the robot is placed and the boarding information of the user, and the processor may detect that the position of the robot corresponds to the destination based on the map data, the destination, and at least one sensing value or a reception value obtained through the position detector.

According to embodiments, the pressure detector may include at least one pressure sensor mounted at at least one position of a seat, a footrest, an armrest, or a backrest of the robot.

According to embodiments, the processor may activate the pressure detector when it is detected that a position detected by the position detector corresponds to the destination.

According to embodiments, the processor may detect that the user gets off the robot when a sensing value of the at least one pressure sensor included in the pressure detector is less than a reference value.

According to embodiments, the processor may determine whether to perform charging based on a remaining power capacity of a battery included in the robot when it is detected that the user gets off the robot, and control the at least one driving motor to travel to a charging station when it is determined to perform charging.

According to embodiments, the processor may estimate a drivable distance based on the remaining power capacity and control the at least one driving motor to travel to the charging station when the estimated drivable distance is shorter than a movement distance to the user's next destination.

According to embodiments, the processor may control the at least one driving motor to travel to a charging station closest to a current position of the robot among a plurality of charging stations.

According to embodiments, the processor may control the at least one driving motor to travel to a charging station closest to a current position of the robot among one or more charging stations having an availability rate less than a preset availability rate.

According to embodiments, the processor may, when it is not detected that the user gets off the robot, perform a first operation of re-searching for a destination of the user and controlling the at least one driving motor to move to the re-searched destination, a second operation of switching a driving mode of the robot to a manual mode and controlling the at least one driving motor in response to an operation of the user, or a third operation of waiting for a predetermined time at a current position of the robot.

According to embodiments, the robot may further include a display device configured to display a screen for selection of at least one of the first to third operations, and the processor may perform the at least one operation selected through the screen.

A method of controlling a robot according to an embodiment includes traveling to a destination of a user who is on board the robot, detecting whether the user gets off the robot through a pressure detector when a position detected by a position detector corresponds to the destination, recognizing whether the user arrives at the destination based on whether the user gets off the robot.

DETAILED DESCRIPTION OF THE PREFERRED EMBODIMENTS

Figure 1:
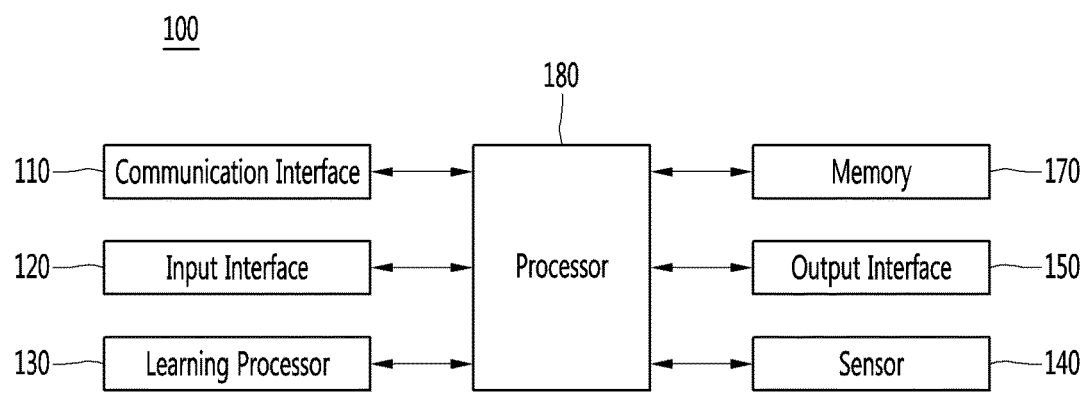
FIG. 1 is an AI device including a robot according to an embodiment of the present disclosure.

Hereinafter, embodiments disclosed herein will be described in detail with reference to the accompanying drawings. Further, the accompanying drawings are intended to facilitate understanding of the embodiments disclosed herein, and the technical idea disclosed herein are not limited by the accompanying drawings. Therefore, the present invention should be construed as including all the changes, equivalents, and substitutions included in the spirit and scope of the present invention.

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

The robot includes a driving part may include an actuator or a motor and may perform various physical operations such as moving a robot joint. In addition, a movable robot may include a wheel, a brake, a propeller, and the like in a driving part, and may travel on the ground through the driving part or fly in the air.

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of learning an artificial neural network in a state in which a label for learning data is given, and the label may mean the correct answer (or result value) that the artificial neural network must infer when the learning data is input to the artificial neural network. The unsupervised learning may refer to a method of learning an artificial neural network in a state in which a label for learning data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep running is part of machine running. In the following, machine learning is used to mean deep running.

Self-driving refers to a technique of driving for oneself, and a self-driving vehicle refers to a vehicle that travels without an operation of a user or with a minimum operation of a user.

For example, the self-driving may include a technology for maintaining a lane while driving, a technology for automatically adjusting a speed, such as adaptive cruise control, a technique for automatically traveling along a predetermined route, and a technology for automatically setting and traveling a route when a destination is set.

The vehicle may include a vehicle having only an internal combustion engine, a hybrid vehicle having an internal combustion engine and an electric motor together, and an electric vehicle having only an electric motor, and may include not only an automobile but also a train, a motorcycle, and the like.

At this time, the self-driving vehicle may be regarded as a robot having a self-driving function FIG. 1 is an AI device including a robot according to an embodiment of the present disclosure.

The AI device 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI device 100 may include a communication interface 110, an input device 120, a learning processor 130, a sensing unit 140, an output interface 150, a memory 170, and a processor 180.

The communication interface 110 may transmit and receive data to and from external devices such as other AI devices 100a to 100e and the AI server 200 by using wire/wireless communication technology. For example, the communication interface 110 may transmit and receive sensor information, a user input, a learning model, and a control signal to and from external devices.

The communication technology used by the communication interface 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee, NFC (Near Field Communication), and the like.

The input interface 120 may acquire various kinds of data.

At this time, the input interface 120 may include a camera for inputting a video signal, a microphone for receiving an audio signal, and a user input interface for receiving information from a user. The camera or the microphone may be treated as a sensor, and the signal acquired from the camera or the microphone may be referred to as sensing data or sensor information.

The input interface 120 may acquire a learning data for model learning and an input data to be used when an output is acquired by using learning model. The input interface 120 may acquire raw input data. In this case, the processor 180 or the learning processor 130 may extract an input feature by preprocessing the input data.

The learning processor 130 may learn a model composed of an artificial neural network by using learning data. The learned artificial neural network may be referred to as a learning model. The learning model may be used to an infer result value for new input data rather than learning data, and the inferred value may be used as a basis for determination to perform a certain operation.

At this time, the learning processor 130 may perform AI processing together with the learning processor 240 of the AI server 200.

At this time, the learning processor 130 may include a memory integrated or implemented in the AI device 100. Alternatively, the learning processor 130 may be implemented by using the memory 170, an external memory directly connected to the AI device 100, or a memory held in an external device.

The sensing unit 140 may acquire at least one of internal information about the AI device 100, ambient environment information about the AI device 100, and user information by using various sensors.

Examples of the sensors included in the sensing unit 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output interface 150 may generate an output related to a visual sense, an auditory sense, or a haptic sense.

At this time, the output interface 150 may include a display for outputting time information, a speaker for outputting auditory information, and a haptic interface for outputting haptic information.

The memory 170 may store data that supports various functions of the AI device 100. For example, the memory 170 may store input data acquired by the input interface 120, learning data, a learning model, a learning history, and the like.

The processor 180 may determine at least one executable operation of the AI device 100 based on information determined or generated by using a data analysis algorithm or a machine learning algorithm. The processor 180 may control the components of the AI device 100 to execute the determined operation.

To this end, the processor 180 may request, search, receive, or utilize data of the learning processor 130 or the memory 170. The processor 180 may control the components of the AI device 100 to execute the predicted operation or the operation determined to be desirable among the at least one executable operation.

When the connection of an external device is required to perform the determined operation, the processor 180 may generate a control signal for controlling the external device and may transmit the generated control signal to the external device.

The processor 180 may acquire intention information for the user input and may determine the user's requirements based on the acquired intention information.

The processor 180 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 130, may be learned by the learning processor 240 of the AI server 200, or may be learned by their distributed processing.

The processor 180 may collect history information including the operation contents of the AI device 100 or the user's feedback on the operation and may store the collected history information in the memory 170 or the learning processor 130 or transmit the collected history information to the external device such as the AI server 200. The collected history information may be used to update the learning model.

The processor 180 may control at least part of the components of AI device 100 so as to drive an application program stored in memory 170. Furthermore, the processor 180 may operate two or more of the components included in the AI device 100 in combination so as to drive the application program.

Figure 2:
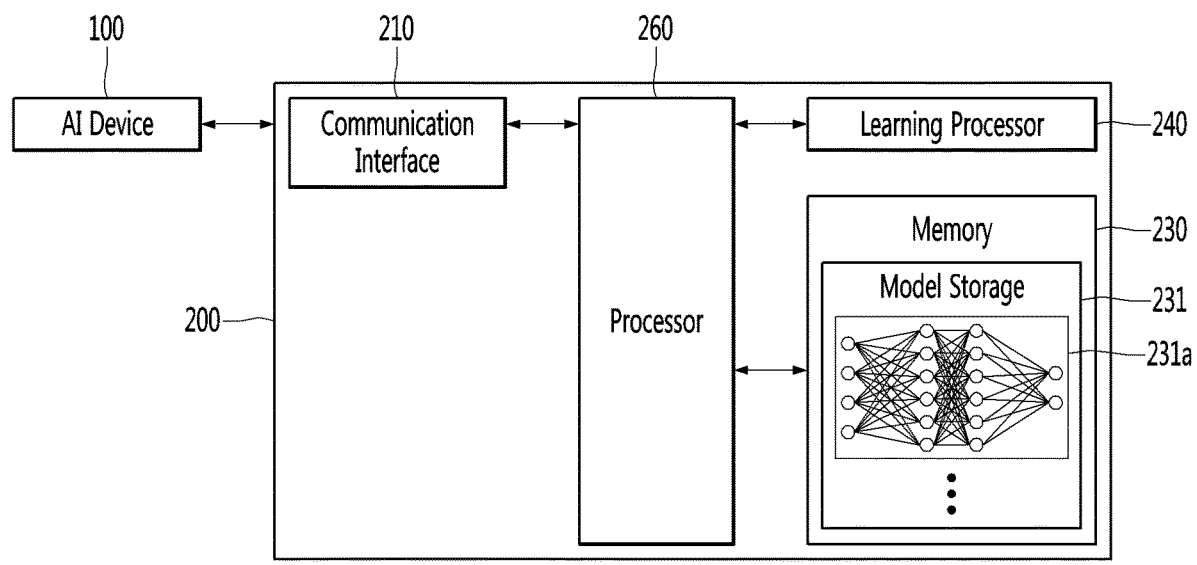
FIG. 2 is an AI server connected to a robot according to an embodiment of the present disclosure.

FIG. 2 is an AI server connected to a robot according to an embodiment of the present disclosure.

Referring to FIG. 2, the AI server 200 may refer to a device that learns an artificial neural network by using a machine learning algorithm or uses a learned artificial neural network. The AI server 200 may include a plurality of servers to perform distributed processing, or may be defined as a 5G network. At this time, the AI server 200 may be included as a partial configuration of the AI device 100, and may perform at least part of the AI processing together.

The AI server 200 may include a communication interface 210, a memory 230, a learning processor 240, a processor 260, and the like.

The communication interface 210 can transmit and receive data to and from an external device such as the AI device 100.

The memory 230 may include a model storage 231. The model storage 231 may store a learning or learned model (or an artificial neural network 231a) through the learning processor 240.

The learning processor 240 may learn the artificial neural network 231a by using the learning data. The learning model may be used in a state of being mounted on the AI server 200 of the artificial neural network, or may be used in a state of being mounted on an external device such as the AI device 100.

The learning model may be implemented in hardware, software, or a combination of hardware and software. If all or part of the learning models are implemented in software, one or more instructions that constitute the learning model may be stored in memory 230.

The processor 260 may infer the result value for new input data by using the learning model and may generate a response or a control command based on the inferred result value.

Figure 3:
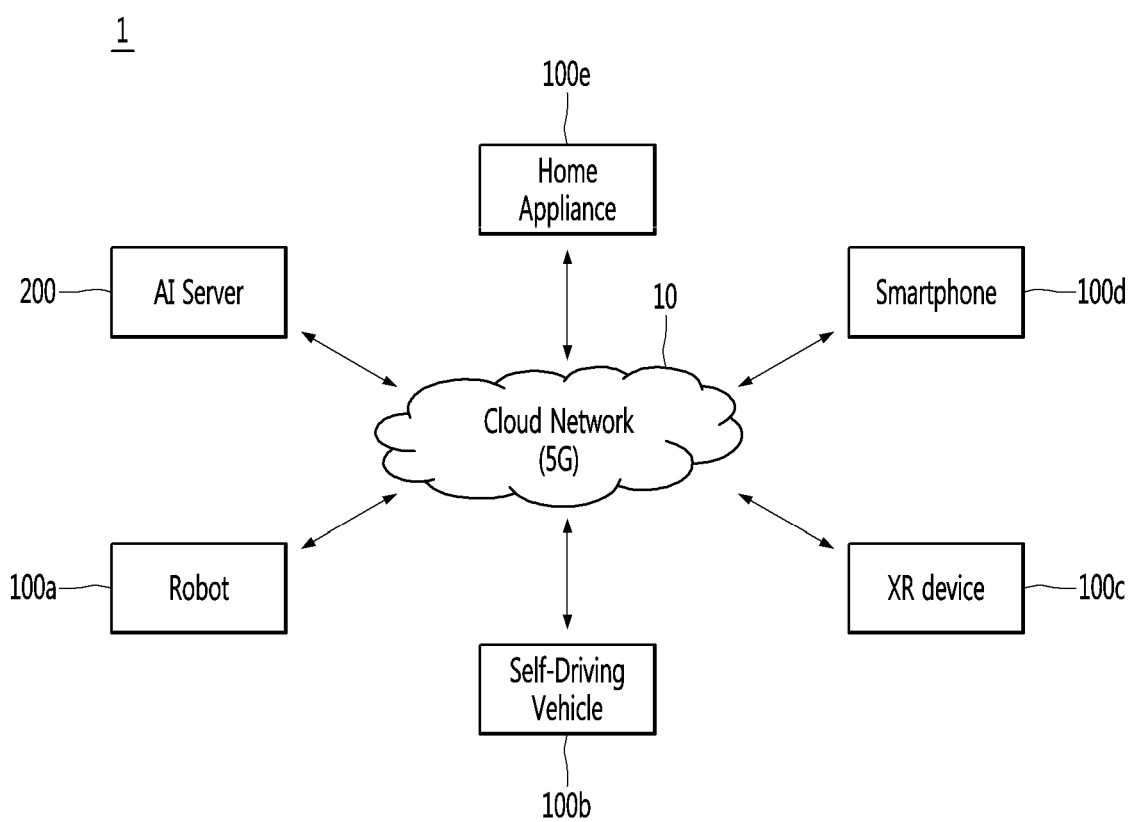
FIG. 3 is an AI system including a robot according to an embodiment of the present disclosure.

FIG. 3 is an AI system including a robot according to an embodiment of the present disclosure.

Referring to FIG. 3, in the AI system 1, at least one of an AI server 200, a robot 100a, a self-driving vehicle 100b, an XR device 100c, a smartphone 100d, or a home appliance 100e is connected to a cloud network 10. The robot 100a, the self-driving vehicle 100b, the XR device 100c, the smartphone 100d, or the home appliance 100e, to which the AI technology is applied, may be referred to as AI devices 100a to 100e.

The cloud network 10 may refer to a network that forms part of a cloud computing infrastructure or exists in a cloud computing infrastructure. The cloud network 10 may be configured by using a 3G network, a 4G or LTE network, or a 5G network.

That is, the devices 100a to 100e and 200 configuring the AI system 1 may be connected to each other through the cloud network 10. In particular, each of the devices 100a to 100e and 200 may communicate with each other through a base station, but may directly communicate with each other without using a base station.

The AI server 200 may include a server that performs AI processing and a server that performs operations on big data.

The AI server 200 may be connected to at least one of the AI devices constituting the AI system 1, that is, the robot 100a, the self-driving vehicle 100b, the XR device 100c, the smartphone 100d, or the home appliance 100e through the cloud network 10, and may assist at least part of AI processing of the connected AI devices 100a to 100e.

At this time, the AI server 200 may learn the artificial neural network according to the machine learning algorithm instead of the AI devices 100a to 100e, and may directly store the learning model or transmit the learning model to the AI devices 100a to 100e.

At this time, the AI server 200 may receive input data from the AI devices 100a to 100e, may infer the result value for the received input data by using the learning model, may generate a response or a control command based on the inferred result value, and may transmit the response or the control command to the AI devices 100a to 100e.

Alternatively, the AI devices 100a to 100e may infer the result value for the input data by directly using the learning model, and may generate the response or the control command based on the inference result.

Hereinafter, various embodiments of the AI devices 100a to 100e to which the above-described technology is applied will be described. The AI devices 100a to 100e illustrated in FIG. 3 may be regarded as a specific embodiment of the AI device 100 illustrated in FIG. 1.

The robot 100a, to which the AI technology is applied, may be implemented as a guide robot, a carrying robot, a cleaning robot, a wearable robot, an entertainment robot, a pet robot, an unmanned flying robot, or the like.

The robot 100a may include a robot control module for controlling the operation, and the robot control module may refer to a software module or a chip implementing the software module by hardware.

The robot 100a may acquire state information about the robot 100a by using sensor information acquired from various kinds of sensors, may detect (e.g., recognize) surrounding environment and objects, may generate map data (e.g., of the surrounding environment), may determine the route and the travel plan (e.g., of the robot 100a), may determine the response to user interaction, or may determine the operation.

The robot 100a may use the sensor information acquired from at least one sensor among the lidar, the radar, and the camera so as to determine the travel route and the travel plan.

The robot 100a may perform the above-described operations by using the learning model composed of at least one artificial neural network. For example, the robot 100a may recognize the surrounding environment and the objects by using the learning model, and may determine the operation by using the recognized surrounding information or object information. The learning model may be learned directly from the robot 100a or may be learned from an external device such as the AI server 200.

At this time, the robot 100a may perform the operation by generating the result by directly using the learning model, but the sensor information may be transmitted to the external device such as the AI server 200 and the generated result may be received to perform the operation.

The robot 100a may use at least one of the map data, the object information detected from the sensor information, or the object information acquired from the external apparatus to determine the travel route and the travel plan, and may control the driving part such that the robot 100a travels along the determined travel route and travel plan.

The map data may include object identification information about various objects arranged in the space in which the robot 100a moves. For example, the map data may include object identification information about fixed objects such as walls and doors and movable objects such as pollen and desks. The object identification information may include a name, a type, a distance, and a position.

In addition, the robot 100a may perform the operation or travel by controlling the driving part based on the control/ interaction of the user. At this time, the robot 100a may acquire the intention information of the interaction due to the user's operation or speech utterance, and may determine the response based on the acquired intention information, and may perform the operation.

The robot 100a, to which the AI technology and the self-driving technology are applied, may be implemented as a guide robot, a carrying robot, a cleaning robot, a wearable robot, an entertainment robot, a pet robot, an unmanned flying robot, or the like.

The robot 100a, to which the AI technology and the self-driving technology are applied, may refer to the robot itself having the self-driving function or the robot 100a interacting with the self-driving vehicle 100b.

The robot 100a having the self-driving function may collectively refer to a device that moves for itself along the given movement line without the user's control or moves for itself by determining the movement line by itself.

The robot 100a and the self-driving vehicle 100b having the self-driving function may use a common sensing method so as to determine at least one of the travel route or the travel plan. For example, the robot 100a and the self-driving vehicle 100b having the self-driving function may determine at least one of the travel route or the travel plan by using the information sensed through the lidar, the radar, and the camera.

The robot 100a that interacts with the self-driving vehicle 100b exists separately from the self-driving vehicle 100b and may perform operations interworking with the self-driving function of the self-driving vehicle 100b or interworking with the user who rides on the self-driving vehicle 100b.

At this time, the robot 100a interacting with the self-driving vehicle 100b may control or assist the self-driving function of the self-driving vehicle 100b by acquiring sensor information on behalf of the self-driving vehicle 100b and providing the sensor information to the self-driving vehicle 100b, or by acquiring sensor information, generating environment information or object information, and providing the information to the self-driving vehicle 100b.

Alternatively, the robot 100a interacting with the self-driving vehicle 100b may monitor the user boarding the self-driving vehicle 100b, or may control the function of the self-driving vehicle 100b through the interaction with the user. For example, when it is determined that the driver is in a drowsy state, the robot 100a may activate the self-driving function of the self-driving vehicle 100b or assist the control of the driving part of the self-driving vehicle 100b. The function of the self-driving vehicle 100b controlled by the robot 100a may include not only the self-driving function but also the function provided by the navigation system or the audio system provided in the self-driving vehicle 100b.

Alternatively, the robot 100a that interacts with the self-driving vehicle 100b may provide information or assist the function to the self-driving vehicle 100b outside the self-driving vehicle 100b. For example, the robot 100a may provide traffic information including signal information and the like, such as a smart signal, to the self-driving vehicle 100b, and automatically connect an electric charger to a charging port by interacting with the self-driving vehicle 100b like an automatic electric charger of an electric vehicle.

Figure 4:
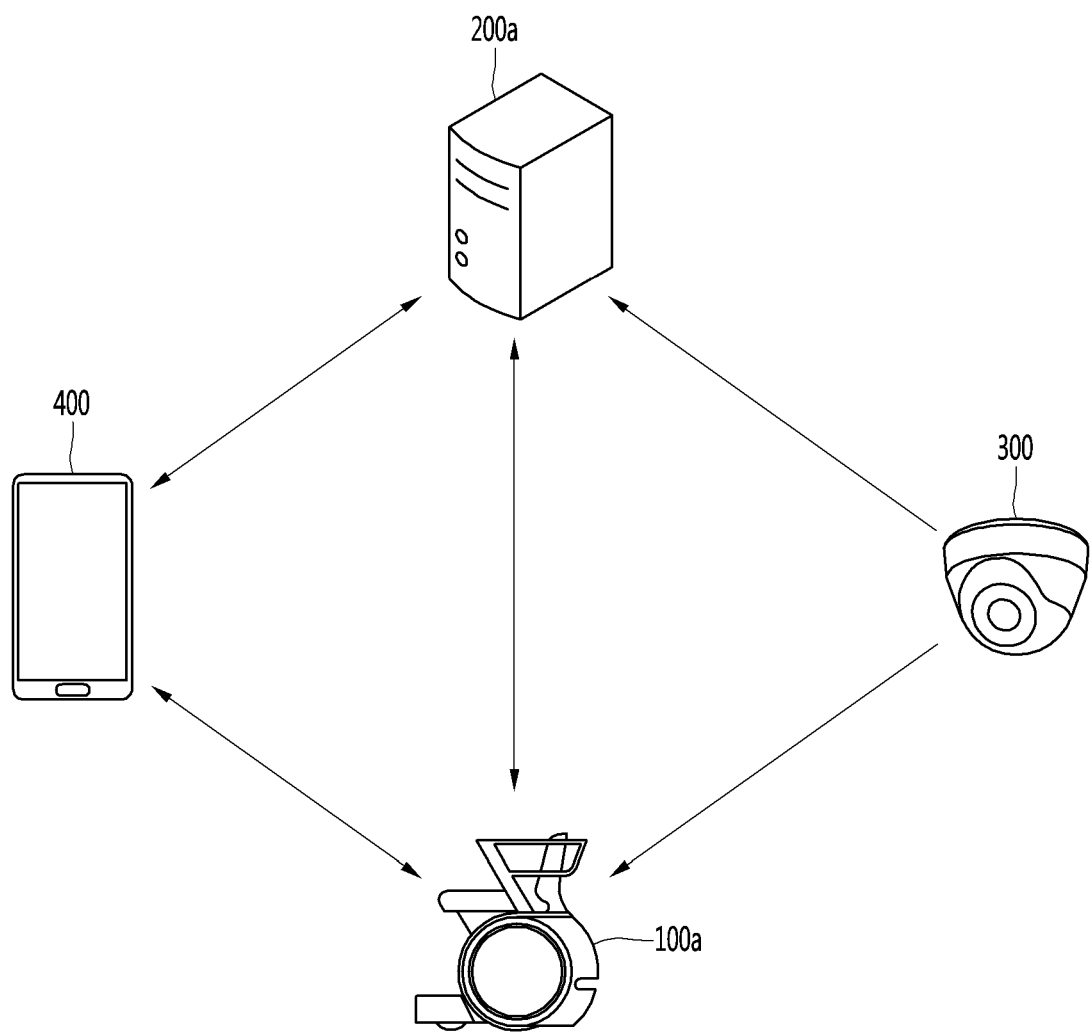
FIG. 4 is a system diagram showing a structure of a robot system according to the embodiments.

Referring to FIG. 4, the robot system may include a robot 100a, a server 200a, a camera 300, and a display device 400 (e.g., mobile terminal, television, etc.).

The robot 100a may perform patrol, guidance, cleaning, disinfection and transportation. For example, the robot 100a may be disposed in an airport, but may be disposed in various indoor or outdoor spaces such as a department store and a park as well as an airport.

The robot 100a may transmit and receive signals to and from the server 200a or the display device 400. For example, the robot 100a may transmit and receive signals including information on the situation to and from the server 200a. In addition, the robot 100a may receive image information of the areas from the camera 300.

Accordingly, the robot 100a may monitor the situation through the image information captured by the robot 100a and the image information received from the camera 300.

The robot 100a may directly receive a command from the user. For example, a command may be directly received from the user through input of touching the display device provided in the robot 100a or voice input.

The robot 100a may perform patrol, guidance, cleaning, etc. according to the command received from the user, the server 200a, or the display device 400.

Next, the server 200a may receive information from the robot 100a, the camera 300, and/or the display device 400. The server 200a may collect, store and manage the information received from the devices. The server 200a may transmit the stored information to the robot 100a or the display device 400. In addition, the server 200a may transmit command signals to a plurality of the disposed robots 100.

The camera 300 may include all cameras which are installed, such as a plurality of closed circuit television (CCTV) cameras, an infrared thermal-sensing camera, etc. The camera 300 may transmit the captured image to the server 200a or the robot 100a.

The display device 400 may transmit and receive data to and from the server 200a. For example, the display device 400 may receive a variety of data such as data related to the characteristics of the spaces, map data of the spaces, and the like from the server 200a. For example, when the server 200a is a server related to an airport, the display device 400 may receive airport-related data such as a flight time schedule, an airport map, a user's boarding schedule, and the like from the server 200a.

The user may receive and obtain information related to the use of spaces from the server 200a through the display device 400. In addition, the display device 400 may transmit data such as a photo, a moving image, a message, etc. to the server 200a. For example, the user may transmit the photograph of a missing child to the server 200a to report the missing child or photograph an area where cleaning is required through the camera to request cleaning of the area.

In addition, the display device 400 may transmit and receive data to and from the robot 100a.

For example, the display device 400 may transmit, to the robot 100a, a signal for calling the robot 100a, a signal for instructing that specific operation is performed, or an information request signal. The robot 100a may move to the position of the display device 400 or perform operation corresponding to the instruction signal in response to the call signal received from the display device 400. Alternatively, the robot 100a may transmit data corresponding to the information request signal to the display device 400 of the user.

For example, the display device 400 may be a device provided in the robot 100a, but is not limited thereto and may include a terminal such as a user's smartphone, a tablet PC, or the like.

Figure 5:
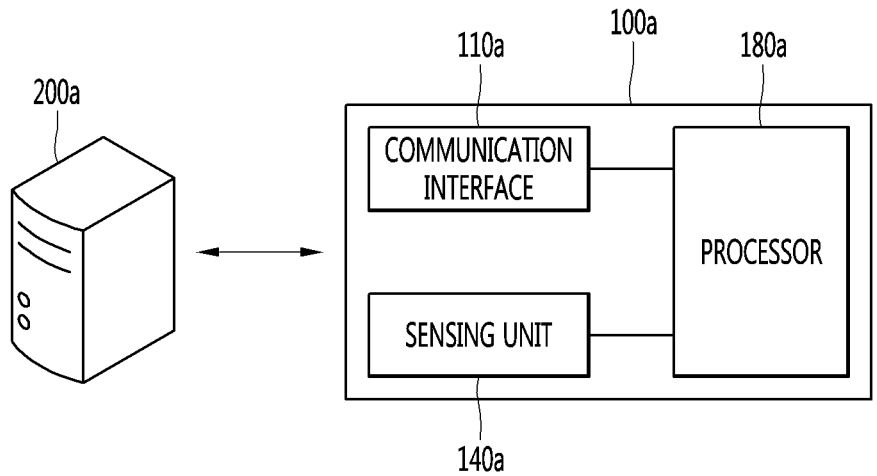
FIG. 5 illustrates a configuration diagram of a robot communicating with a server according to an embodiment of the present disclosure.

FIG. 5 illustrates a configuration diagram of a robot 100a that communicates with the server 200a according to an embodiment of the present disclosure.

Referring to FIG. 5, the robot 100a may communicate with the server 200a, and the robot 100a may include a communication interface 110a, a sensing unit 140a, and a processor 180a.

The server 200a may store data on a map and a movement path of a space. In addition, the server 200a may store the boarding information of the user. The server 200a may manage all pieces of boarding information of the robot 100a used by a plurality of users. For example, the server 200a may manage the boarding information obtained by integrating not only a position at which the user comes on board, but also a position of the charging station that performs charging, and positions of the robot 100a and the charging station.

The server 200a may communicate with the robot 100a, and may provide boarding information on a location of a user or a charging station in a short range, and the robot 100a may be provided with the communication interface 110a to communicate with the server 200a in a space.

The robot 100a may receive the boarding information from the server 200a and move the user to a destination included in the boarding information through autonomous driving by charged power. According to an embodiment, when the user comes on board and information on a destination is input through the display device 400, the robot 100a may set a route to the input destination and travel.

The robot 100a may move itself to a charging station for charging based on a remaining power capacity after the destination is reached and the user gets off the robot 100a.

In this case, since the robot 100a needs to perform a task of moving to the charging station subsequently without ending the task even after a passenger gets off the robot 100a, it is necessary to accurately recognize whether the user has got off the robot 100a after having completely finished the use of the robot 100a.

Therefore, even when the robot 100a arrives at the destination on a guide route, an occupant may want to reach a correct spot even within the range of the destination for example, in the case of the robot 100a targeting a handicapped person. Therefore, the robot 100a needs to recognize and deal with the difference between the destination on the guide route and the spot where the occupant actually wants to get off.

The robot 100a may include a communication interface 110a, a sensing unit 140a, and a processor 180a. However, the components included in the robot 100a according to the present embodiment are not limited thereto, and the robot 100a may include components included in the AI device 100 illustrated in FIG. 1 or more components.

In addition, although not shown, the robot 100a may further include a driving part for driving. The driving part may include at least one driving motor for providing a driving force to at least one wheel or the like provided in the robot 100a. The processor 180a may control the traveling of the robot 100a by controlling the driving of the at least one driving motor.

The communication interface 110a may receive a map of the space (e.g., surrounding areas, areas to be traveled by the robot) and a movement path of the space from the server 200a. The communication interface 110a may store a map storing main points of the space in advance, and transmit the movement path of the robot 100a to the server 200a in real time, and the server 200a may store such information and transmit the information to the display device 400 provided in the display device 400, which is then displayed to the user.

The communication interface 110a may transmit/receive the boarding information of the user or the position information of the robot 100a to/from the server 200a. The boarding information may be provided from the server 200a, which may be provided to the server 200a through reservation by a user or may be provided to the server 200a using the display device 400 in real time.

The communication interface 110a may transmit/receive data to/from external devices such as another AI device 100 or the AI server 200 using wired or wireless communication technologies. For example, the communication interface 110a may transmit/receive sensor information, a user input, a learning model, a control signal, or the like with the external devices.

The communication technology used by the communication interface 110a may include GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee, NFC (Near Field Communication), and the like.

The sensing unit 140a may include at least one sensor that detects whether the user moves or not in order to determine whether the user has left after arriving at the destination using the map received through the communication interface 110a.

For example, the sensing unit 140a may include a position detector that determines a position of the user; a pressure detector that detects a weight of a seat or footrest to detect the departure of the user. Each of the position detector and the pressure detector may include at least one sensor or receiver.

The at least one sensor included in the sensing unit 140a may be installed on the rear side, the side, the bottom or the like of the robot 100a, and may include all means capable of detecting a current position of the robot 100a. In addition, the at least one sensor included in the sensing unit 140a may include a sensor that detects a movement such as a pressure sensor or a vibration sensor capable of recognizing the user's movement under the assumption that the user moves to get off the robot 100a when the user arrives at the destination.

The processor 180a may recognize whether the user has arrived at the destination using the boarding information or the destination information received from the communication interface 110a and the current position recognized by the position detector. For example, the position detector of the sensing unit 140a may include a lidar (Light Detection and Ranging), a GPS receiver, or the like. The processor 180a may recognize the current position of the robot 100a and the user through the map data of the space received from the server 200a or the like and at least one sensing value or received value obtained from the position detector.

The position detector may include various sensors, receivers, and the like for detecting the position of the robot 100a, such as a GPS receiver and a lidar. The processor 180a may map the current position measured by the position detector onto a map provided from the server 200a and determine whether a user has arrived at a desired destination.

Since the fact that the destination has been reached does not mean the completion of the use of the robot 100a, the passenger may need to provide the intention of getting off, and determination basis for determining that the user gets off completely is required.

At least one sensor included in the pressure detector may be used to detect whether the user has left the robot 100a, and may be mounted around the user who is on board, for example, at least one position of a seat, a footrest, an armrest, or a backrest of the robot 100a. When the sensing value (e.g., the pressure value) of the at least one sensor included in the pressure detector is zero (or is less than a reference value), the processor 180a may detect that the user gets off the robot 100a, and recognize that the user has arrived at the his/her desired destination.

After the robot 100a detects that the position detected by the position detector corresponds to the destination, the robot 100a may recognize whether the user has arrived at the destination finally by detecting that the user gets off (leaves) the robot using the sensing value of the pressure detector. In other words, the processor 180a may activate the pressure detector after it is detected that the position detected by the position detector corresponds to the destination, thereby preventing the inefficient use of the pressure sensor and the waste of power.

That is, although the arrival at the destination is detected through the position detector, the robot 100a may determine that the robot 100a does not arrive at the destination unless the user gets off the robot 100a.

When it is recognized that the user gets off the robot 100a using the sensing value of the pressure detector, the robot 100a may determine the current position as the final destination.

The processor 180a may determine whether the user has arrived at the destination by using the sensing result of the sensing unit 140a, and in the case of the arrival at the destination, restrict the boarding of another user and control the driving part (e.g., at least one driving motor) of the robot 100a such that the robot 100a returns to the charging station closest to the destination. On the other hand, when the user does not arrive at the destination, the processor 180a may move the robot 100a to a re-searched destination through re-searching in an autonomous mode state, or switch to a manual mode to allow the user to further move the robot 100a.

According to an embodiment, the robot 100a may further include a display device 400 installed toward the user's gaze direction to display the map and the movement path to the user. The operation of the display device 400 may be controlled by the processor 180a of the robot 100a. Alternatively, the operation of the display device 400 may be controlled by a processor included in the display device 400 itself, and in this case, the display device 400 and the robot 100a may transmit and receive signals or data to and from each other according to a wired or wireless communication method.

For example, the display device 400 may include an input interface (touch screen, button, or the like) to receive various inputs from the user. In addition, when the robot 100a has arrived at the set destination, the display device 400 may receive a confirmation of whether the user arrives at the desired destination. When the robot 100a have not arrived at the desired destination, the display device 400 may receive an input for switching a driving mode to the autonomous mode or the manual mode.

The display device 400 is a kind of interface between the robot 100a and the user and may be means for receiving a command from the user and displaying a current control state to the user.

When the robot 100a has arrived at the destination, the display device 400 may display a notification screen indicating that the robot 100a has arrived at the destination, and receive confirmation of whether the arrival at the desired destination is completed from the use by displaying a pop-up window such as an 'OK' button.

In addition, the display device 400 may receive switching to the manual mode from the user during the autonomous mode, that is, during autonomous driving, and when the manual mode is selected, the robot 100a may display a control pad for enabling the user's operation through a pop-up window.

The processor 180a may control the driving of the robot 100a according to the user's selection in the display device 400. The robot 100a may be continuously driven in the autonomous mode without switching to the manual mode when the arrival at the destination is determined.

When the arrival at the destination is recognized through the sensing unit 140a, the processor 180a may control the movement to the charging station based on a remaining power capacity of the battery.

For example, the processor 180a may determine that charging is required when the remaining power capacity is less than a reference capacity.

According to an embodiment, after the arrival at the destination is completed, the processor 180a may estimate a drivable distance based on the remaining power capacity and determine whether to perform charging based on the estimated drivable distance.

For example, the processor 180a may control the driving part (such as a driving motor) to move to the charging station when the estimated drivable distance is less than a predetermined reference distance.

Alternatively, the processor 180a may determine whether the next user who is reserved after the arrival at the user's destination is able to move to a destination of the next user, based on the estimated drivable distance. The processor 180a may determine that the next user is able to move to the destination when the estimated drivable distance is longer than the movement distance to the next user's destination and provide a service to the next user without performing charging. On the other hand, the processor 180a may control the movement to the charging station for charging, for example, the charging station closest to the robot 100a when the estimated drivable distance is shorter than the movement distance to the destination of the next user. In this case, the next user who is reserved will be able to board a robot other than the robot 100a and move to a destination.

Here, the communication interface 110a may receive information about the surrounding environment from the server 200a and control the movement to the nearest charging station in consideration of the current position of the robot 100a.

In a case where there is a limit in the number of objects to be charged for each charging station when moving to the charging station after completion of use, it is necessary to determine whether it is possible to be charged before movement to the charging station.

The search and selection for the charging station to which the robot 100a is to move may be performed in consideration of the location and availability of the charging station.

The processor 180a may receive the location information or availability information of the charging station which interworks with the server 200a from the server 200a through the communication interface 110a and control movement to the charging station corresponding to a predetermined distance or availability the use the location information or available information of the charging station among a plurality of charging stations.

For example, the processor 180a may assign priorities of the plurality of charging stations with the location information as the first priority and the availability information as the second priority.

When determining that the user has arrived at the destination selected by the user, the processor 180a may arrange the plurality of charging stations in the order of distances and determine the availability of the nearest charging station to control the movement.

When searching for the charging station to move after a passenger gets off, the distances between the destination and the surrounding charging stations may be calculated and the nearest place is assigned the highest priority. According to the priorities, it is determined whether or not the charging station is able to perform charging through communication with the robot 100*a*.

The determination of the availability rate may determine which percentage of charging pads on the bottom of the charging station are operating or whether there is a free space by sensing a floor area covered by the robot 100*a* which is being parked and charged in the charging station.

That is, when the battery needs to be charged, the robot 100*a* may move to the nearest charging station and the battery may be charged, thereby 1) minimizing unnecessary moving lines and reducing congestion of general pedestrians using space, 2) minimizing unnecessary battery consumption to improve battery efficiency, and 3) shortening the time required for recharging to improve the operational efficiency of the entire boarding robots.

Figure 6:
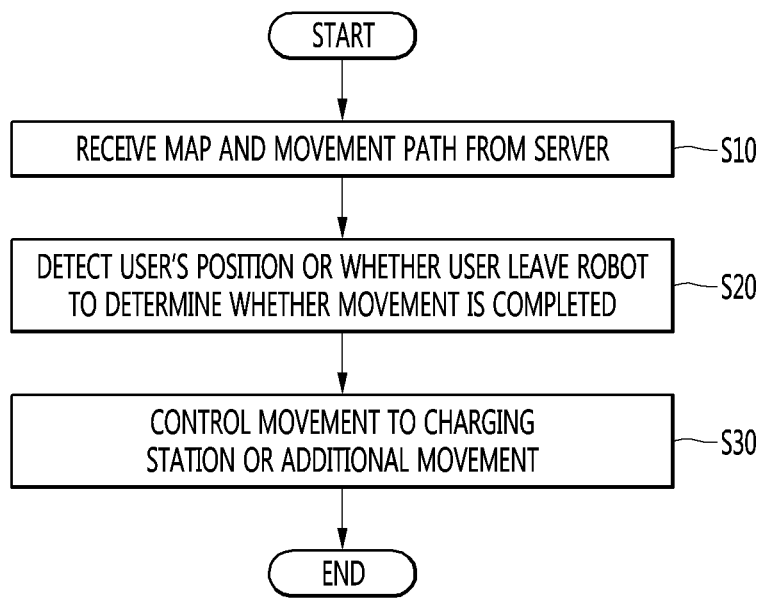
FIG. 6 illustrates a flowchart of a method of controlling a robot according to an embodiment of the present disclosure.

FIG. 6 is a flowchart illustrating a control method of a robot according to an embodiment of the present disclosure.

Referring to FIG. 6, the present disclosure may include the step of receiving a map and a movement path from the server 200*a* (S10), the step of detecting a user's position or whether the user leaves a robot 100*a* to determine whether the movement is completed (S20) and the step of controlling moving to a charging station or an additional movement (S30).

The step of receiving the map and the movement path from the server 200*a* (S10) may be performed by the communication interface 110*a* of the robot 100*a* and the map and the movement path may be received from the server 200*a* through the communication interface 110*a* in real time before or during the driving of the robot 100*a*.

According to an embodiment, the movement path may be generated by the robot 100*a* or the display device 400 provided in the robot 100*a*. For example, when a user inputs information about a destination through the display device 400, the robot 100*a* or the display device 400 may generate a movement path based on the current position and the input destination.

The robot 100*a* may perform matching of the destination through the map and the movement path provided from the server 200*a* to determine whether the destination is reached based on the coordinates.

The step of detecting the user's position or whether the user leaves the robot to determine whether the movement is completed (S20) may be a process of detecting whether the user has actually arrived at a desired destination through a position detector and a pressure sensor in the sensing unit 140*a* using the map received by the communication interface 110*a* after the arrival at the destination.

When it is detected that the robot 100*a* has arrived at the destination based on the map and the movement path, the robot 100*a* may receive a confirmation for the arrival at the destination from the user through the display device 400. When the current position is not a destination desired by the user, the robot 100*a* may receive an input for switching the driving mode into the autonomous mode or the manual mode through the display apparatus 400.

The step of controlling moving to the charging station or the additional movement (S30) may be a process of determining whether the destination is reached, moving to the charging station or the next user's boarding position when the arrival position is the destination, or researching the destination or switching to the manual mode to enable the user to control the additional movement when the arrival position is not the destination, in the processor 180*a*.

The above-described process will be described with reference to the detailed flowchart of FIG. 7.

Figure 7:
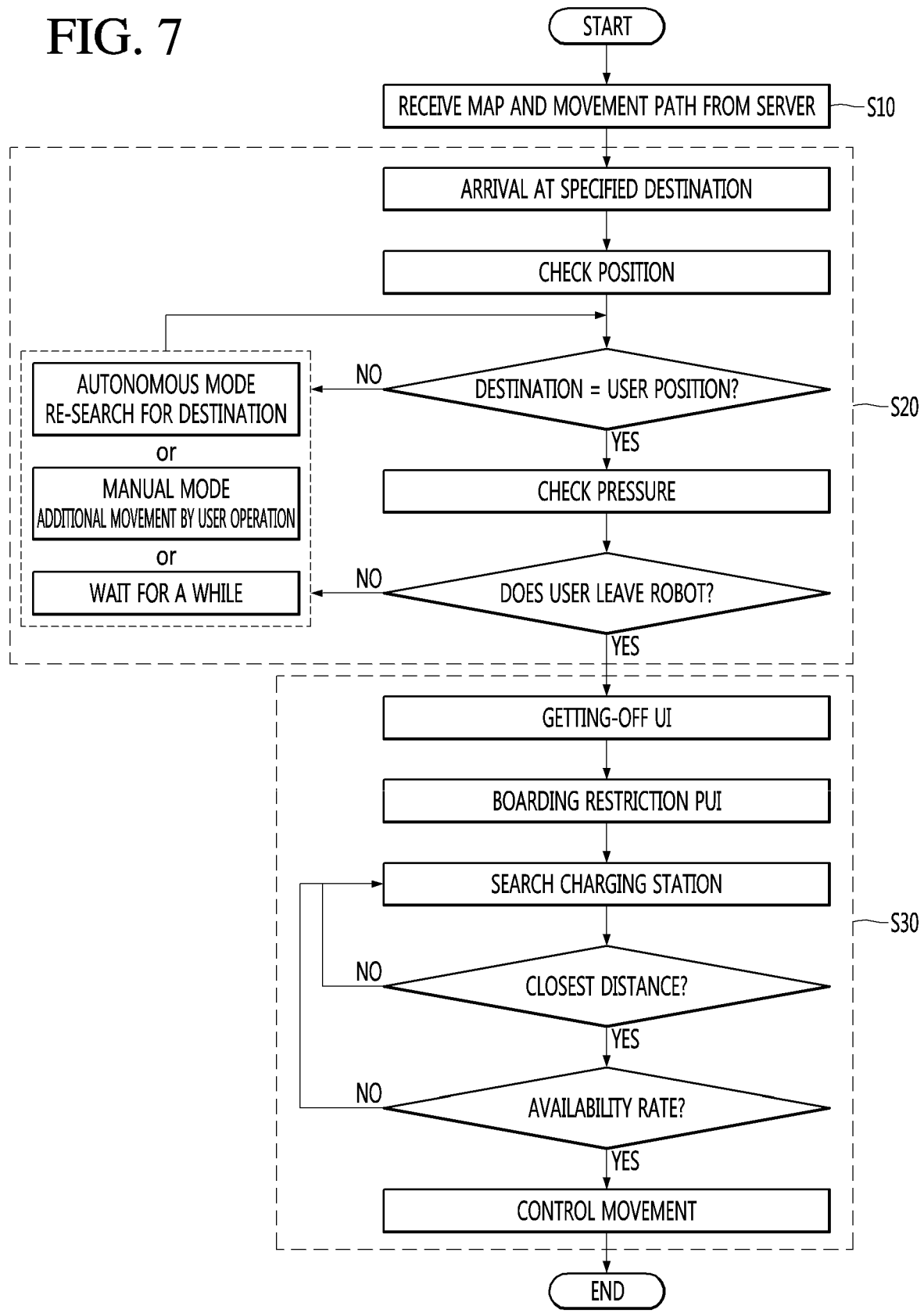
FIG. 7 illustrates a detailed flowchart of a method of controlling a robot according to an embodiment of the present disclosure.

FIG. 7 is a detailed flowchart of a method of controlling the robot 100*a* according to an embodiment of the present invention.

Referring to FIG. 7, the step of receiving a map and a movement path from the server 200*a* (S10) is the same as that in FIG. 6, and the step of detecting a user's position or whether the user leaves a robot to determine whether the movement is completed (S20) and the step of controlling a charging station or an additional movement (S30) will be described below.

The step of detecting a user's position or whether the user leaves a robot to determine whether the movement is completed (S20) may be a step of determining whether a correct destination (the destination desired by the user) is reached through the position detector after the arrival at the destination specified by the user.

The position detector may include the step of comparing the position of the user (or robot) with the destination based on the map. The position detector may be implemented using a GPS, a lidar, and the like, and may include means for detecting the position of the robot 100*a*.

The processor 180*a* may map the current position of the robot 100*a* measured by the position detector onto a map provided from the server 200*a* and determine whether the destination has been reached by the robot 100*a*. Since the fact that the destination has been reached does not mean the completion of the use of the robot, the passenger may need to provide the intention of getting off, and determination basis for determining that the user gets off completely is required.

In this case, the processor 180*a* may secondly determine whether the destination is reached through the pressure detector. The processor 180*a* may primarily determine the arrival at the destination by using the position detector, and secondly, may recognize whether the user actually gets off (leaves) the robot 100*a* through the pressure detector.

The robot 100*a* may identify the pressure sensing values of the seat and the footrest through the pressure sensor.

According to an embodiment of the present disclosure, the pressure detector may include pressure sensors installed on the seat and the footrest, respectively, or may include pressure sensors installed on various positions such as a backrest or an armrest in order to detect whether the user gets off (leaves) the robot.

As described above, the processor 180*a* may determine whether the destination detected by the position detector is a destination desired by the user using the pressure detector, and when the destination detected by the position detector is not a destination desired by the user using the pressure detector, display a screen for selecting a driving mode on the display device 400 (e.g., a pop-up window).

For example, the screen may include a selection item for re-searching for a destination in an autonomous mode in which autonomous driving is performed, a selection item for moving the robot 100*a* by the user's operation by switching to a manual mode, a selection item for allowing the robot 100*a* to wait for a predetermined time, and the like.

In addition, even when the destination detected by the position detector is a destination desired by the user, the processor 180*a* may not determine that the final destination is reached when it is not detected that the user gets off the robot through the pressure detector. In this case, the processor 180a may display a screen for selecting the driving mode through the display device 400.

When the processor 180a determines that the final destination is reached by the robot, the processor 180a may search for a charging station or control additional movement of the robot.

In this case, the processor 180a may output a getting-off UI (e.g., a print user interface (PUI)) through the display device 400 to induce getting-off of the user. In addition, the processor 180a may include a process of changing the shape of the robot 100a or resetting the robot 100a related to the getting-off of the user.

In addition, when another user attempts to use the robot 100a, the processor 180a may output a boarding restriction UI for restricting boarding through a warning sound or a warning indicating that boarding is restricted for the next reserved user.

The step of controlling a charging station or an additional movement (S30) may be a process determining whether the destination is reached and controlling the movement according to the determination result in the processor 180a.

When it is determined that the battery of the robot 100a needs to be charged, the processor 180a may receive position information or availability information of a charging station from the server 200a through the communication interface 110a.

This process includes selecting a charging station closest to the destination among a plurality of charging stations; and determining whether the availability information of the selected charging station corresponds to a preset availability rate.

In a case where there is a limit in the number of objects to be charged for each charging station when moving to the charging station after completion of use, it is necessary to determine whether it is possible to be charged before movement to the charging station.

The search and selection for the charging station to which the robot 100a is to move may be performed in consideration of the location and availability of the charging station.

The processor 180a may receive the location information or availability information of the charging station which interworks with the server 200a from the server 200a through the communication interface 110a and control movement to the charging station corresponding to a predetermined distance or availability the use the location information or available information of the charging station among a plurality of charging stations.

The processor 180a may assign priorities of the plurality of charging stations with the location information as the first priority and the availability information as the second priority.

When determining that the user has arrived at the destination selected by the user, the processor 180a may arrange the plurality of charging stations in the order of distances and determine the availability of the nearest charging station to control the movement.

When the availability rate of the charging station is less than the preset availability rate, the method may include the step of re-selecting a charging station second closest to the destination among the plurality of charging stations, and determining the availability rate.

According to an embodiment of the present disclosure, when one space is empty on the assumption that four robots can be charged, the availability rate may be set to 25%. When the availability rate is greater than or equal to 25%, it is possible to move the robot 100a. However, when the availability rate is less than 25%, a charging station with the next-priority in terms of distance may be searched in terms of distance, and the availability rate may be again checked.

According to the present disclosure, the robot can prevent the occupant's safety accident by accurately detecting the user's getting off through the sensors after the arrival at the destination.

In addition, when the robot needs to be charged, the robot can be charged at the nearest charging station, thereby minimizing unnecessary moving lines and reducing congestion of general pedestrians using space, minimizing unnecessary battery consumption due to movement to improve battery efficiency, and shortening the time required for recharging to improve the operational efficiency of all robots.

According to the present disclosure, the robot can prevent the occupant's safety accident by accurately detecting the user's getting off through the sensors after the arrival at the destination.

In addition, the robot can provide a variety of activities by providing switching between manual/autonomous driving modes and a mode for enabling waiting in a state of being on board after the set destination is reached.

In addition, when the robot needs to be charged, it is possible to allowing the robot to be charged at the nearest charging station, thereby minimizing unnecessary moving lines, and reducing congestion of general pedestrians using a space where the robot is disposed.

In addition, the robot has the advantage of increasing the battery efficiency by minimizing unnecessary battery consumption, and the time required for recharging to increase the operating efficiency.

Hereinabove, although the present disclosure has been described with reference to embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the embodiments of the present disclosure are provided to explain the spirit and scope of the present disclosure, but not to limit them, so that the spirit and scope of the present disclosure is not limited by the embodiments.

The scope of the present disclosure should be construed on the basis of the accompanying claims, and all the technical ideas within the scope equivalent to the claims should be included in the scope of the present disclosure.

What is claimed is:

1. A robot, comprising:
    a seat;
    a footrest;
    at least one driving motor configured to provide a driving force for moving the robot;
    a position detector including at least one sensor or a receiver for detecting a position of the robot;
    a pressure detector including at least one sensor for detecting a weight of the seat or the footrest to determine whether a user is on the robot; and
    a processor configured to:
        receive boarding information of the user, the boarding information including a destination,
        detect the position of the robot through the position detector while the robot is traveling,
        detect, by the pressure detector, whether the user gets off the robot when the detected position corresponds to the destination, recognize that the user has arrived at the destination when the pressure detector detects that the user gets off the robot, recognize that the user has not arrived at the destination when the pressure detector detects that the user remains on the robot, and when the pressure detector detects that the user remains on the robot, perform:
- a first operation of re-searching for a new destination of the user and controlling the at least one driving motor to move the robot to the new destination, or
- a second operation of switching a driving mode of the robot to a manual mode and controlling the at least one driving motor in response to an operation of the user, or
- a third operation of waiting for a predetermined time at a current position of the robot.

2. The robot of claim 1, further comprising a communication interface configured to receive map data related to a space in which the robot is placed and the boarding information, wherein the processor is further configured to detect that the position of the robot corresponds to the destination based on the map data, the destination, and a sensing value or a reception value obtained through the position detector.

3. The robot of claim 1, further comprising:
an armrest; and
a backrest,
wherein the at least one sensor of the pressure detector includes at least one pressure sensor mounted on the seat, the footrest, the armrest, or the backrest.

4. The robot of claim 3, wherein the processor is further configured to activate the pressure detector from a deactivated state when it is detected that the position of the robot detected by the position detector corresponds to the destination.

5. The robot of claim 3, wherein the processor is further configured to detect that the user gets off the robot when a sensing value of the at least one pressure sensor of the pressure detector is less than a reference value.

6. The robot of claim 1, further comprising a battery,
wherein the processor is further configured to:
determine, when it is detected that the user gets off the robot, whether to perform charging of the battery based on a remaining power capacity of the battery, and
when it is determined to perform charging, control the at least one driving motor to cause the robot to travel to a charging station.

7. The robot of claim 6, wherein the processor is further configured to:
estimate a drivable distance based on the remaining power capacity of the battery, and
when the estimated drivable distance is shorter than a movement distance to the user's next destination, control the at least one driving motor to cause the robot to travel to the charging station.

8. The robot of claim 6, wherein the processor is further configured to select the charging station from a plurality of charging stations, and
wherein the charging station is selected based on being closest to the current position of the robot among the plurality of charging stations.

9. The robot of claim 8, wherein the charging station is selected based on being closest to the current position of the robot from charging stations among the plurality of charging stations having an availability rate less than a preset availability rate.

10. The robot of claim 1, further comprising a display device configured to display a screen for selection, by the user, of one of the first operation, the second operation and the third operation,
wherein the processor is configured to perform the one of the first operation, the second operation, and the third operation selected through the screen.

11. A method of controlling a robot, comprising:
detecting, by a pressure sensor of the robot, whether a user is on board the robot;
moving the robot to a destination of the user;
detecting, by a position sensor of the robot, a position of the robot;
when the position of the robot detected by the position detector corresponds to the destination, detecting, by the pressure detector of the robot, whether the user gets off the robot;
when the pressure detector detects that the user is off the robot after detecting that the position of the robot corresponds to the destination, recognizing that the user has arrived at the destination;
recognizing that the user does not arrive at the destination when the pressure detector detects that the user remains on the robot; and
performing a first operation of re-searching for a new destination of the user and controlling the robot to move the new destination, a second operation of switching a traveling mode of the robot to a manual mode and controlling the robot in response to an operation of the user, or a third operation of waiting for a predetermined time at a current position of the robot.

12. The method of claim 11, further comprising activating the pressure detector from a deactivated state when the position of the robot corresponds to the destination.

13. The method of claim 11, wherein the robot further includes:
a seat;
a footrest;
an armrest; and
a backrest, and
wherein the pressure detector includes at least one pressure sensor mounted on the seat, the footrest, the armrest, or the backrest.

14. The method of claim 13, wherein the detecting of whether the user gets off the robot includes detecting that the user gets off the robot when a sensing value of the at least one pressure sensor is less than a reference value.

15. The method of claim 11, wherein the robot further includes a battery, and
wherein the method further comprises:
after recognizing that the user has arrived at the destination, determining whether to perform charging of the battery based on a remaining power capacity of the battery; and
when it is determined to perform charging of the robot, moving the robot to a charging station.

16. The method of claim 15, wherein the determining of whether to perform charging includes:
estimating a drivable distance based on the remaining power capacity; and
when the estimated drivable distance is shorter than a movement distance to a next destination of the user, determining to perform charging of the battery.

17. The method of claim 15, further comprising selecting the charging station from a plurality of charging stations,
   wherein the charging station is selected based on being closest to the current position of the robot among the plurality of charging stations.

18. A robot, comprising:
   a position sensor for detecting a position of the robot;
   a pressure sensor for detecting whether a user is on the robot; and
   a processor configured to:
      receive boarding information,
      control the robot to move to a destination included in the boarding information,
      recognize that the user has arrived at the destination when the pressure detector detects that the user gets off the robot,
      recognize that the user has not arrived at the destination when the pressure detector detects that the user remains on the robot, and
      when the pressure detector detects that the user remains on the robot, perform:
         a first operation of re-searching for a new destination of the user and controlling the at least one driving motor to move the robot to the new destination, or
         a second operation of switching a driving mode of the robot to a manual mode and controlling the at least one driving motor in response to an operation of the user, or
         a third operation of waiting for a predetermined time at a current position of the robot.

\* \* \* \* \*